(12) United States Patent
Chang

(10) Patent No.: US 11,819,969 B2
(45) Date of Patent: Nov. 21, 2023

(54) ROBOTIC TOOL CHANGER FOR MACHINING CENTER

(71) Applicant: SANJET INTERNATIONAL CO., LTD., Taichung (TW)

(72) Inventor: Ching-San Chang, Taichung (TW)

(73) Assignee: SANJET INTERNATIONAL CO., LTD., Taichung (TW)

( * ) Notice: Subject to any disclaimer, the term of this patent is extended or adjusted under 35 U.S.C. 154(b) by 86 days.

(21) Appl. No.: 17/712,488

(22) Filed: Apr. 4, 2022

(65) Prior Publication Data

US 2023/0311259 A1 Oct. 5, 2023

(51) Int. Cl.
*B23Q 3/157* (2006.01)
*B23Q 3/155* (2006.01)
(Continued)

(52) U.S. Cl.
CPC ....... *B23Q 3/15713* (2013.01); *B23Q 3/1554* (2013.01); *B23Q 2003/155418* (2016.11);
(Continued)

(58) Field of Classification Search
CPC ......... Y10T 483/1764; Y10T 483/1755; Y10T 483/1762; Y10T 74/184; Y10T 74/18384;
(Continued)

(56) References Cited

U.S. PATENT DOCUMENTS 4,396,344 A * 8/1983 Sugimoto ............... B25J 9/104
414/706
5,752,905 A * 5/1998 Yan ..................... B23Q 5/347
483/44

(Continued)

FOREIGN PATENT DOCUMENTS

CN 202344310 U 7/2012
CN 108788872 A 11/2018
(Continued)

OTHER PUBLICATIONS

Machine Translation of CN 214393384 U, which CN '384 was published Oct. 2021.*

(Continued)

*Primary Examiner* — Erica E Cadugan
(74) *Attorney, Agent, or Firm* — Birch, Stewart, Kolasch & Birch, LLP

(57) ABSTRACT

A robotic tool changer for machining center includes a drive mechanism, a first motor, and a rotary seat which are mounted on a body. The drive mechanism includes a first rotating shaft, a second rotating shaft, a first swing arm, a second swing arm, and a linkage member. The first rotating shaft and the second rotating shaft are arranged in parallel. The first swing arm is connected to the first rotating shaft while the second swing arm is connected to the second rotating shaft. Two ends of the linkage member are pivotally connected to the first swing arm and the second swing arm respectively. An end of the second rotating shaft is fixed to the rotary seat. Thereby, when the first motor drives the first rotating shaft to rotate, the rotary seat is driven to turn over. Thereby, with the configuration of the first motor and the drive mechanism, the hydraulic oil leakage and the environmentally unfriendly subsequent treatment of the hydraulic oil when the hydraulic cylinder is used as a power source can be improved.

12 Claims, 14 Drawing Sheets

(51) Int. Cl.
*B25J 9/04* (2006.01)
*B25J 9/12* (2006.01)

(52) U.S. Cl.
CPC ............ *B23Q 2003/155428* (2016.11); *B23Q 2003/155432* (2016.11); *Y10T 483/1764* (2015.01)

(58) Field of Classification Search
CPC . Y10T 74/20305–20366; B23Q 2003/155432; B23Q 2003/155428; B23Q 3/1554; Y10S 901/18; B25J 9/105; B25J 9/02–9/148
USPC ......... 483/43, 39, 42; 74/68, 490.01–490.11, 74/66; 901/18
See application file for complete search history.

(56) References Cited

U.S. PATENT DOCUMENTS

| | | | | |
|---|---|---|---|---|
| 6,773,382 B2* | 8/2004 | Kato | .................... | B23Q 3/1554 483/45 |
| 7,211,033 B2* | 5/2007 | Prust | .................. | B23Q 3/15553 483/902 |
| 8,777,823 B2* | 7/2014 | Isozumi | ............... | B23Q 3/1554 483/44 |
| 2011/0177925 A1* | 7/2011 | Mayr | ................... | B23Q 3/1554 483/49 |

FOREIGN PATENT DOCUMENTS

| | | |
|---|---|---|
| CN | 110587350 A | 12/2019 |
| CN | 111958286 A | 11/2020 |
| CN | 113231866 A | 8/2021 |
| CN | 214393384 U | 10/2021 |
| JP | 61-142038 A * | 6/1986 |
| TW | M627918 U | 6/2022 |
| WO | WO 2008/129842 A1 | 10/2008 |

OTHER PUBLICATIONS

Taiwanese Search Report for Taiwanese Application No. 111105965, dated Oct. 24, 2022, with English translation.

* cited by examiner

Embodiment in which the First Motor Drives the First Rotating Shaft to Make the First Swing Arm Complete One Rotation So That the Linkage Member Drives the Second Swing Arm to Complete One Reciprocating Swing Between Angles of 0 degrees and 90 degrees

FIG. 14

ROBOTIC TOOL CHANGER FOR MACHINING CENTER

BACKGROUND OF THE INVENTION

Technical Field

The present invention relates generally to a machining center, and more particularly relates to a robotic tool changer for machining center.

Description of Related Art

It is known that a machining center provided with a tool magazine achieves the purpose of rapid tool-changing through an automatic tool changing mechanism. The automatic tool changing mechanism includes a tool changing assembly which has a rotating shaft and a tool changing arm connected to an end of the rotating shaft. The tool changing arm is driven to drive the tool changing arm to rotate to exchange tools. However, the tool changing assembly of some models must further be able to be controlled and displaced between two fixed positions so as to exchange a tool at the spindle of the machining center for a tool at the tool magazine.

In a mechanism in which the tool changing assembly does a reciprocating turning-over between two fixed positions at the angles of 0 degrees and 90 degrees, the tool changing assembly is mounted at a rotary seat which can rotate in a range of 90 degrees. To smoothly drive the rotary seat to rotate, it is known to use a hydraulic cylinder which generates a greater output power as a power source. However, the hydraulic cylinder has the problem of hydraulic oil leakage and the subsequent treatment of the hydraulic oil is environmentally unfriendly. And, it is limited in use that the temperature of the hydraulic oil should not be too high. Hence, it is still a need to provide an improvement that the existing hydraulic system is regarded as the way to drive the rotary seat to rotate.

In addition, the same hydraulic system that is used to be the existing power source for driving the rotating shaft of the tool changing assembly needs also to be improved.

BRIEF SUMMARY OF THE INVENTION

In view of the above, the primary purpose of the present invention is to provide a robotic tool changer for machining center, which takes electric control as the main power source to drive the robotic tool changer to be actuated.

The present invention provides a robotic tool changer for machining center including a body, a drive mechanism, a first motor, and a rotary seat. The drive mechanism includes a first rotating shaft, a second rotating shaft, a first swing arm, a second swing arm, and a linkage member. The first rotating shaft and the second rotating shaft respectively rotatably pass through the body, and a part of the first rotating shaft and that of the second rotating shaft are located outside the body. The first swing arm is fixed to the part of the first rotating shaft outside the body. The second swing arm is fixed to the part of the second rotating shaft outside the body. The linkage member includes two ends which are pivotally connected to the first swing arm and the second swing arm respectively. The first motor is for driving the first rotating shaft to rotate. The rotary seat is fixed to the second rotating shaft and moves in a reciprocating rotational movement between a first position and a second position.

The advantage of the present invention is that, with the configuration of the first motor and the drive mechanism, the effect that the hydraulic cylinder could generate a great output power can be achieved, and meanwhile, the hydraulic oil leakage and the environmentally unfriendly subsequent treatment of the hydraulic oil when the hydraulic cylinder is used as power source can be improved.

BRIEF DESCRIPTION OF THE SEVERAL VIEWS OF THE DRAWINGS

The present invention will be best understood by referring to the following detailed description of some illustrative embodiments in conjunction with the accompanying drawings, in which

FIG. 14 schematically depicts a further embodiment.

DETAILED DESCRIPTION OF THE INVENTION

The following illustrative embodiments and drawings are provided to illustrate the disclosure of the present invention, these and other advantages and effects can be clearly understood by persons skilled in the art after reading the disclosure of this specification.

Figure 1:
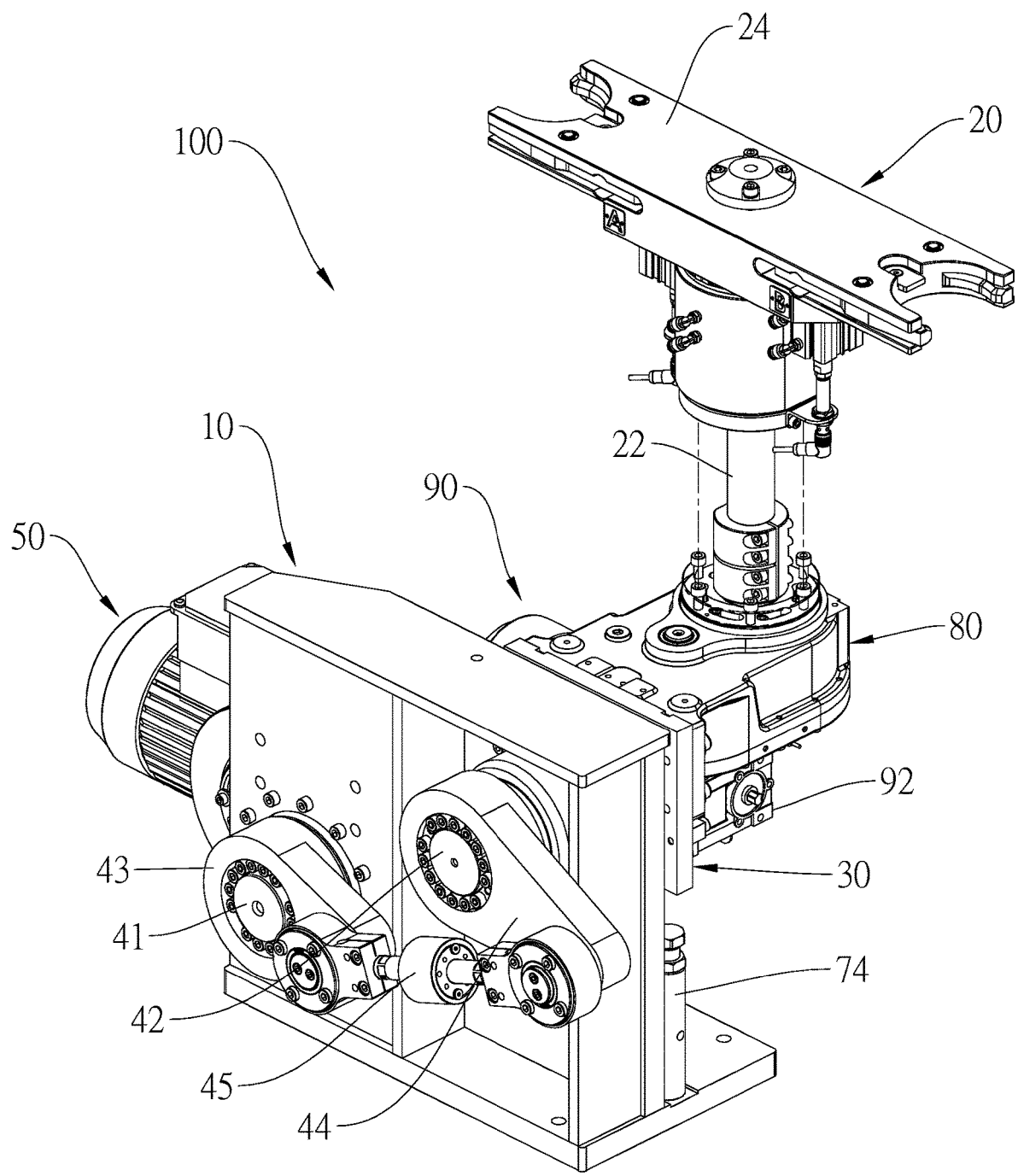
FIG. 1 is a perspective view of a robotic tool changer for machining center of a preferred embodiment according to the present invention.
Figure 2:
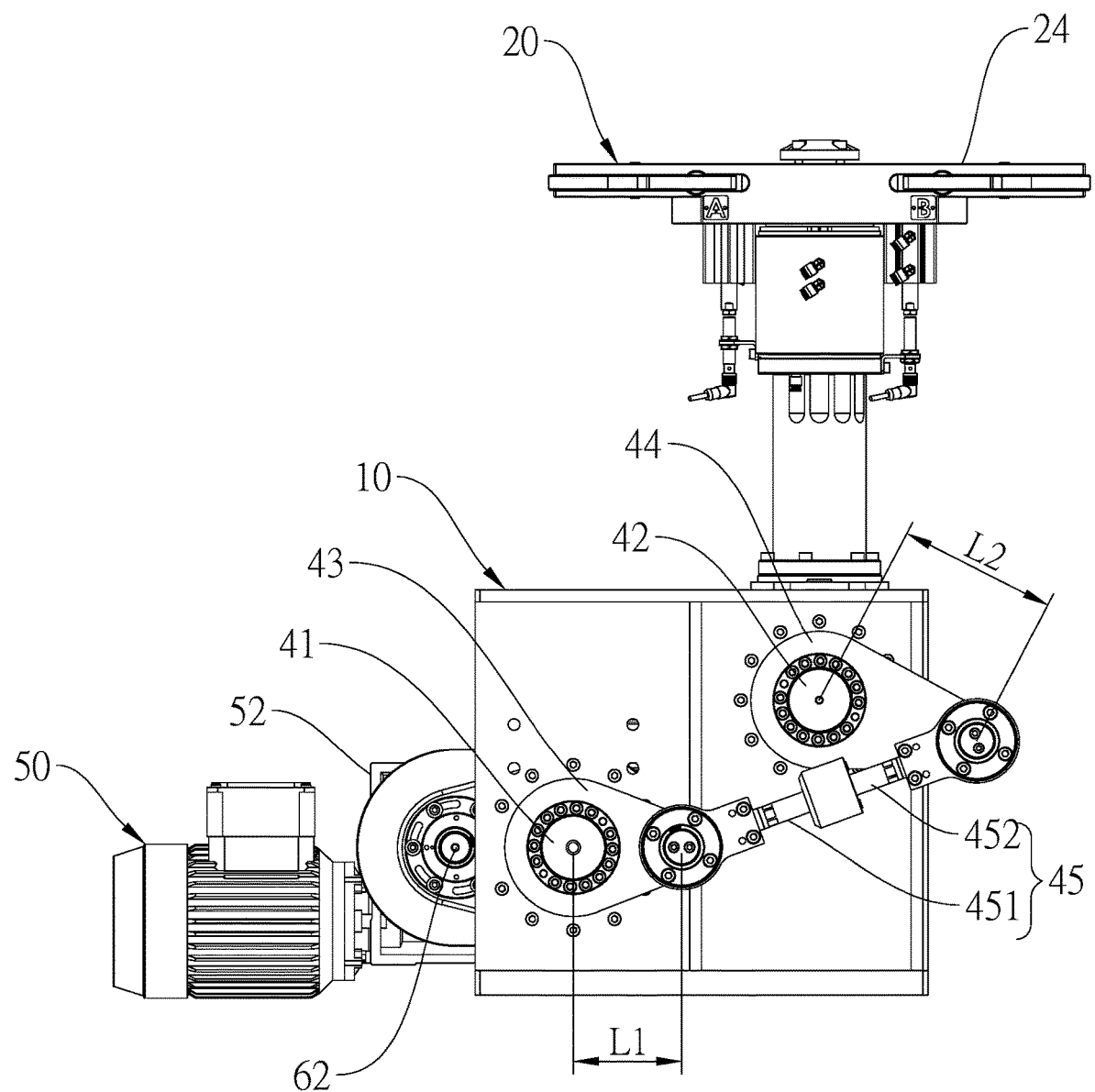
FIG. 2 is a front view of the robotic tool changer for machining center of FIG. 1.
Figure 3:
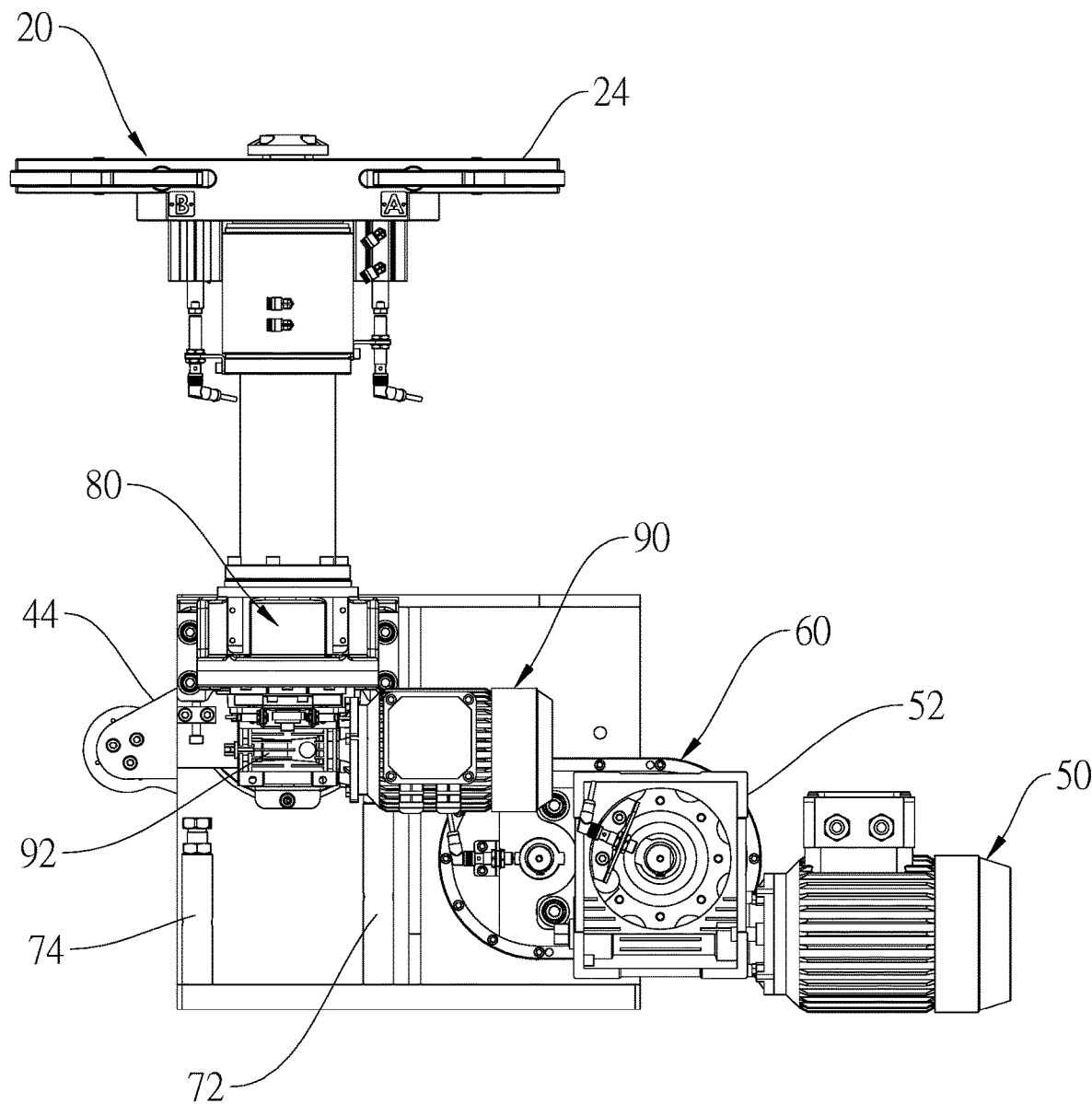
FIG. 3 is a back view of the robotic tool changer for machining center of FIG. 1.
Figure 6:
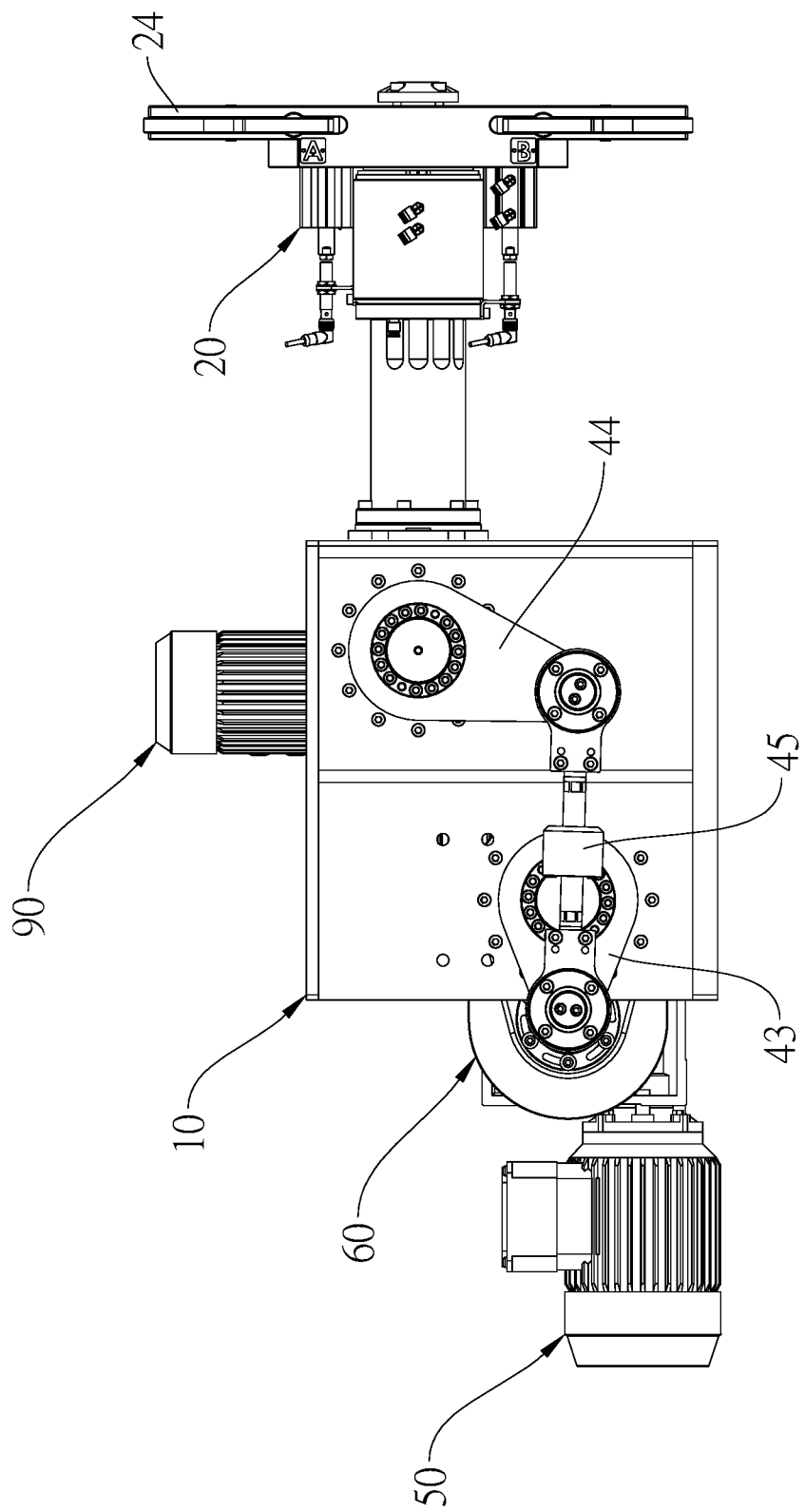
FIG. 6 is a front view showing the working state of the robotic tool changer for machining center.

As shown in FIG. 1 to FIG. 3, a robotic tool changer for machining center 100 of a preferred embodiment according to the present invention is for exchanging a tool at the spindle of the machining center for a tool at the tool magazine. The robotic tool changer 100 includes a body 10 and a tool changing assembly 20. The body 10 is stably fixed while the tool changing assembly 20 is mounted on the body 10 and is controlled to move in a reciprocating movement between two fixed positions through a rotary seat 30. The actual position of each fixed position is determined based on the actual work requirements. In the current embodiment, the tool changing assembly 20 is controlled to do a reciprocating turning-over between two fixed positions at the angle of 0 degrees (shown in FIGS. 2) and 90 degrees (shown in FIG. 6). In addition, the tool changing assembly 20 includes a rotating shaft 22 and a tool changing arm 24. The rotating shaft 22 is controlled to rotate, and the tool changing arm 24 is connected to an end of the rotating shaft 22 and has opposite ends for respectively gripping a tool (not shown). The tool changing arm 24 is driven by the rotating shaft 22 to do a 180 degrees reciprocating rotation.

As shown in FIG. 4 to FIG. 11, the robotic tool changer 100 further includes a drive mechanism 40, a first motor 50, a first cam indexer 60, a confining structure 70, a second cam indexer 80, and a second motor 90.

The drive mechanism 40 includes a first rotating shaft 41, a second rotating shaft 42, a first swing arm 43, a second swing arm 44, and a linkage member 45. The first rotating shaft 41 and the second rotating shaft 42 respectively rotatably pass through two through holes on a front lateral plate 12 of the body 10. Preferably, each of the two through holes is provided with a bearing housing 46 and each of the rotating shafts respectively through the bearing housing 46. The bearing housing 46 stably supports each of the rotating shafts and enables them to rotate smoothly. In addition, an end of the second rotating shaft 42 is fixed to the rotary seat 30 through a plurality of bolts 47 and the second rotating shaft 42 can drive the rotary seat 30 to turn over. The first swing arm 43 and the second swing arm 44 is an eccentric structure. The first swing arm 43 is fixed to the part of the first rotating shaft 41 outside the body 10. The second swing arm 44 is fixed to the part of the second rotating shaft 42 outside the body 10. The linkage member 45 has opposite ends which are pivotally connected to the first swing arm 43 and the second swing arm 44 respectively to form a mechanically linked structure.

Figure 4:
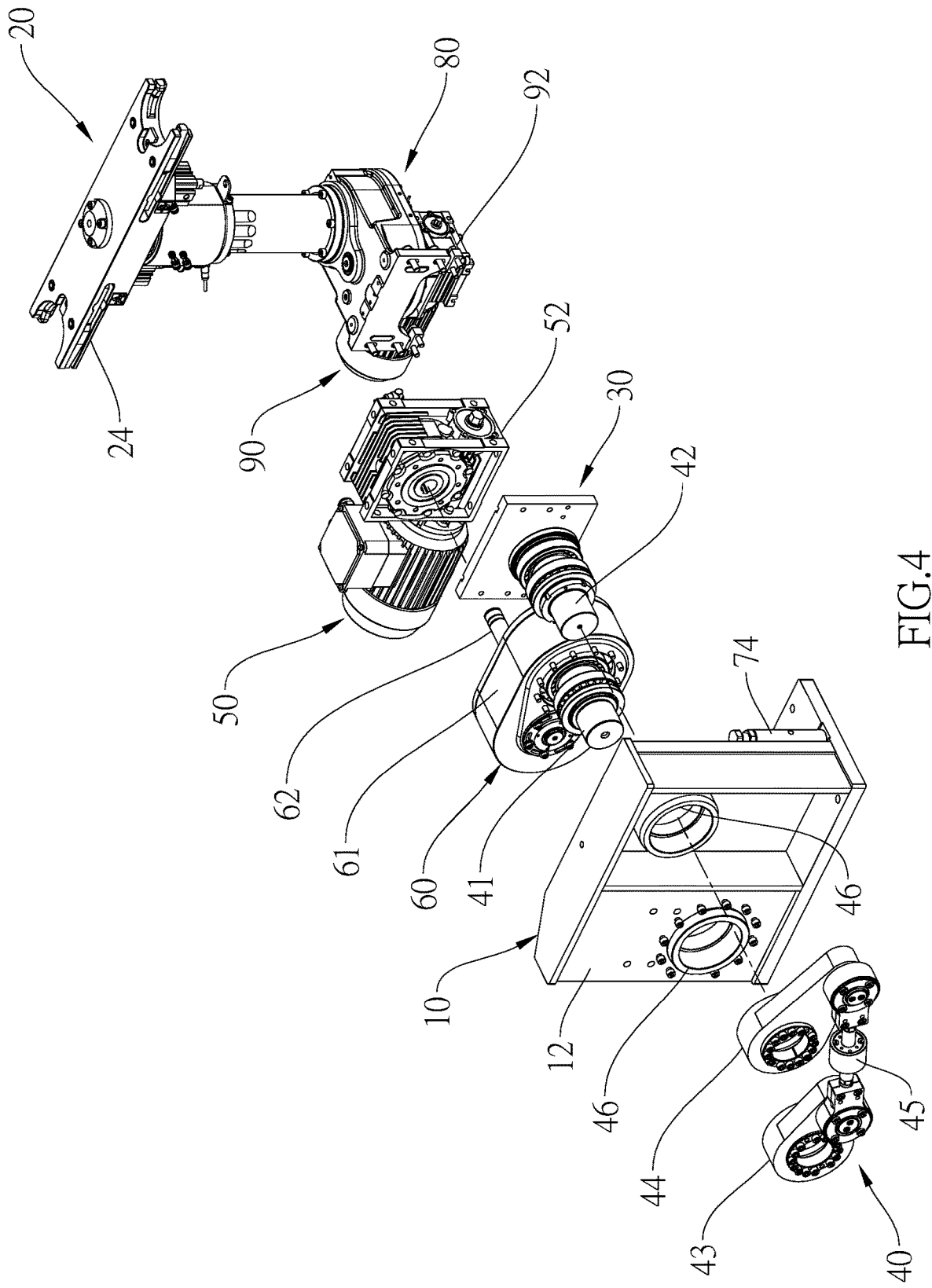
FIG. 4 is an exploded view of the robotic tool changer for machining center of FIG. 1.

The first rotating shaft 41 and the second rotating shaft 42 are arranged in parallel. As shown in FIG. 2 and FIG. 4, the first swing arm 43 takes an axis of the first rotating shaft 41 as a rotation center while the second swing arm 44 takes an axis of the second rotating shaft 42 as a rotation center. A distance from a pivot center between the first swing arm 43 and one end of the linkage member 45 to the rotation center of the first swing arm 43 is defined as a first distance L1. A distance from a pivot center between the second swing arm 44 and the other end of the linkage member 45 to the rotation center of the second swing arm 44 is defined as a second distance L2. The first distance L1 is less than the second distance L2.

Figure 5:
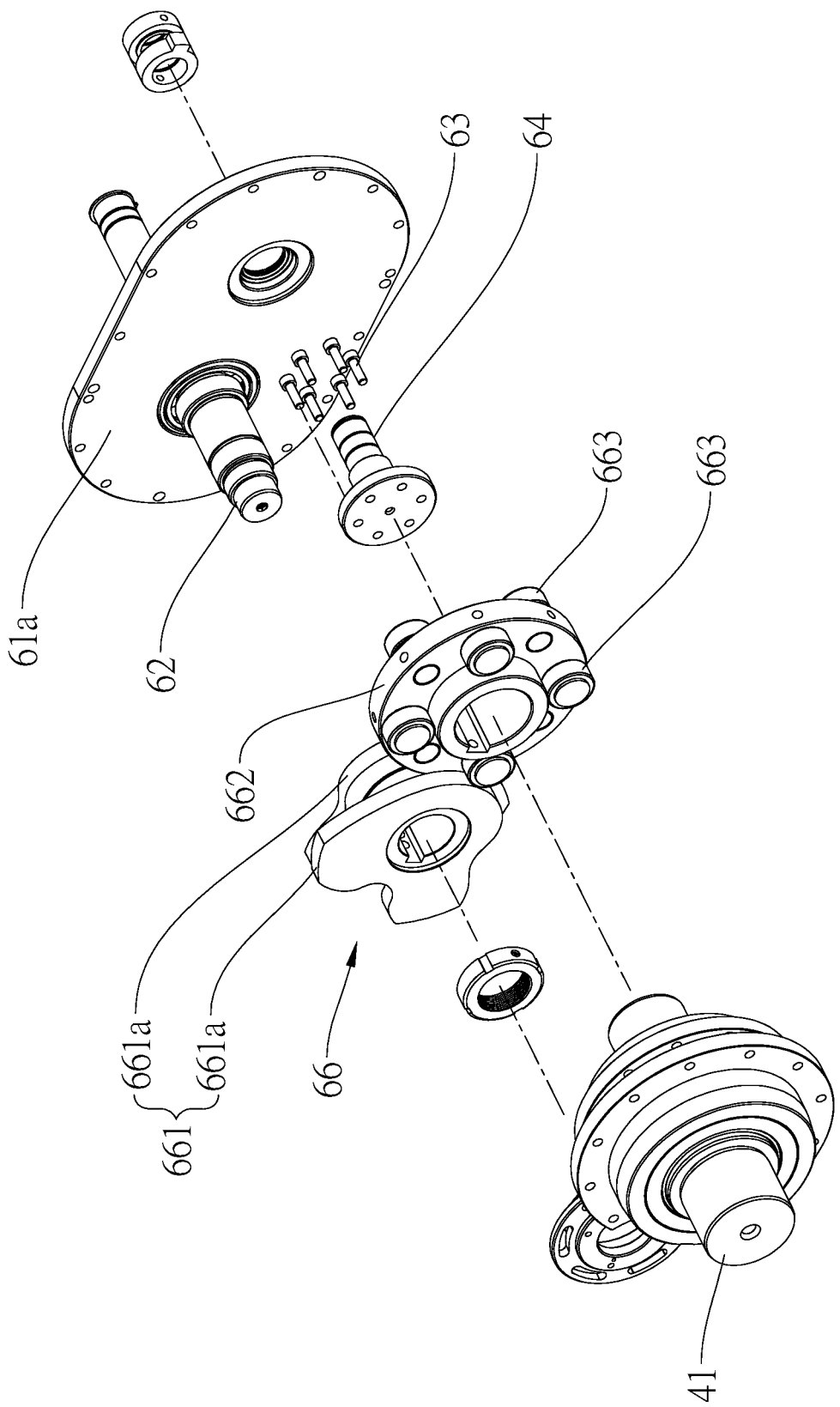
FIG. 5 is a partial exploded view of the robotic tool changer for machining center of FIG. 4.

The first motor 50 is for driving the first rotating shaft 41 to rotate. In the current embodiment, a front end of the first motor 50 is connected to a gear reducer 52 and the first cam indexer 60 is disposed between the gear reducer 52 and the drive mechanism 40. As shown in FIG. 5, the first cam indexer 60 includes a casing 61 and a first input shaft 62, a first output shaft 64, and a first indexing structure 66 which are disposed in the casing 61. The first input shaft 62 and the first output shaft 64 are arranged in parallel. One end of the first input shaft 62 passes through a casing plate 61a of the casing 61 while the other end thereof passes through the gear reducer 52. The first motor 50 drives the first input shaft 62 to rotate through the gear reducer 52. The first output shaft 64 is coaxially connected to the first rotating shaft 41 through a plurality of bolts 63. In practice, the first output shaft 64 and the first rotating shaft 41 can be formed integrally. The first input shaft 62 drives the first output shaft 64 to rotate through the first indexing structure 66. In the current embodiment, the first indexing structure 66 includes a first rotating cam 661, a first index plate 662 and a plurality of first index members 663. The first input shaft 62 passes through the first rotating cam 661 and drives the first rotating cam 661 to rotate. The first index plate 662 is sleeved on a part where the first output shaft 64 and the first rotating shaft 41 are connected in a way that the first index plate 662 is mechanically linked with the first output shaft 64 or the first rotating shaft 41. The way that the first input shaft 62 is mechanically linked with the first rotating cam 661 and the way that the first index plate 662 is mechanically linked with the first output shaft 64 or the first rotating shaft are in the mode of keys and corresponding keyways, so as to achieve the purpose of linking.

In the above, when the first motor 50 drives the first input shaft 62 to make the first rotating cam 661 rotate, the first rotating cam 661 pushes the plurality of first index members 663 respectively so that the first index plate 662 drives the first rotating shaft 41 to rotate. The two ends of the linkage member 45 are respectively pivotally connected to the first rotating shaft 41 and the second rotating shaft 42, and the distance (the first distance L1) from the pivot center between the first swing arm 43 and one end of the linkage member 45 to the rotation center of the first swing arm 43 is less than the distance (the second distance L2) from the pivot center between the second swing arm 44 and the other end of the linkage member 45 to the rotation center of the second swing arm 44 so that the first swing arm 43 driven by the first rotating shaft 41 swings through a large angle to drive the second swing arm 44 to swing through a smaller angle, and the purpose of the first rotating shaft 41 synchronously driving the second rotating shaft 42 to rotate is achieved. In the current embodiment, the first rotating shaft 41 drives the first swing arm 43 to do a reciprocating swing between angles of 0 degrees and 180 degrees (shown in FIG. 2 and FIG. 6) while the second swing arm 44 does a reciprocating swing between angles of 0 degrees and 90 degrees. In another embodiment, schematically shown in FIG. 14, the first rotating shaft 41 drives the first swing arm 43 to complete one rotation, so that the linkage member 45 drives the second swing arm 44 to complete one reciprocating swing between angles of 0 degrees and 90 degrees.

In addition, to make the first cam indexer 60 more compact, the first index members 663 are arranged in a staggered manner on a front surface and a back surface of the first index plate 662. The first rotating cam 661 includes two plate cams 661a, which alternately push against the first index members 663 arranged on the front surface and the back surface of the first index plate 662 so that the first index plate 662 can rotate smoothly. The first index member 663 is a bearing with a shaft, but not limited thereto, it could be other equivalent structures, such as a roller. It can be seen that the first cam indexer 60 is a parallel indexer which generates large torque. It is noted that, in other embodiments, the input shaft and the output shaft of the first cam indexer can be arranged non-parallel. For example, when the input shaft is provided with a globoid cam, the input shaft is perpendicular to the output shaft.

Figure 7:
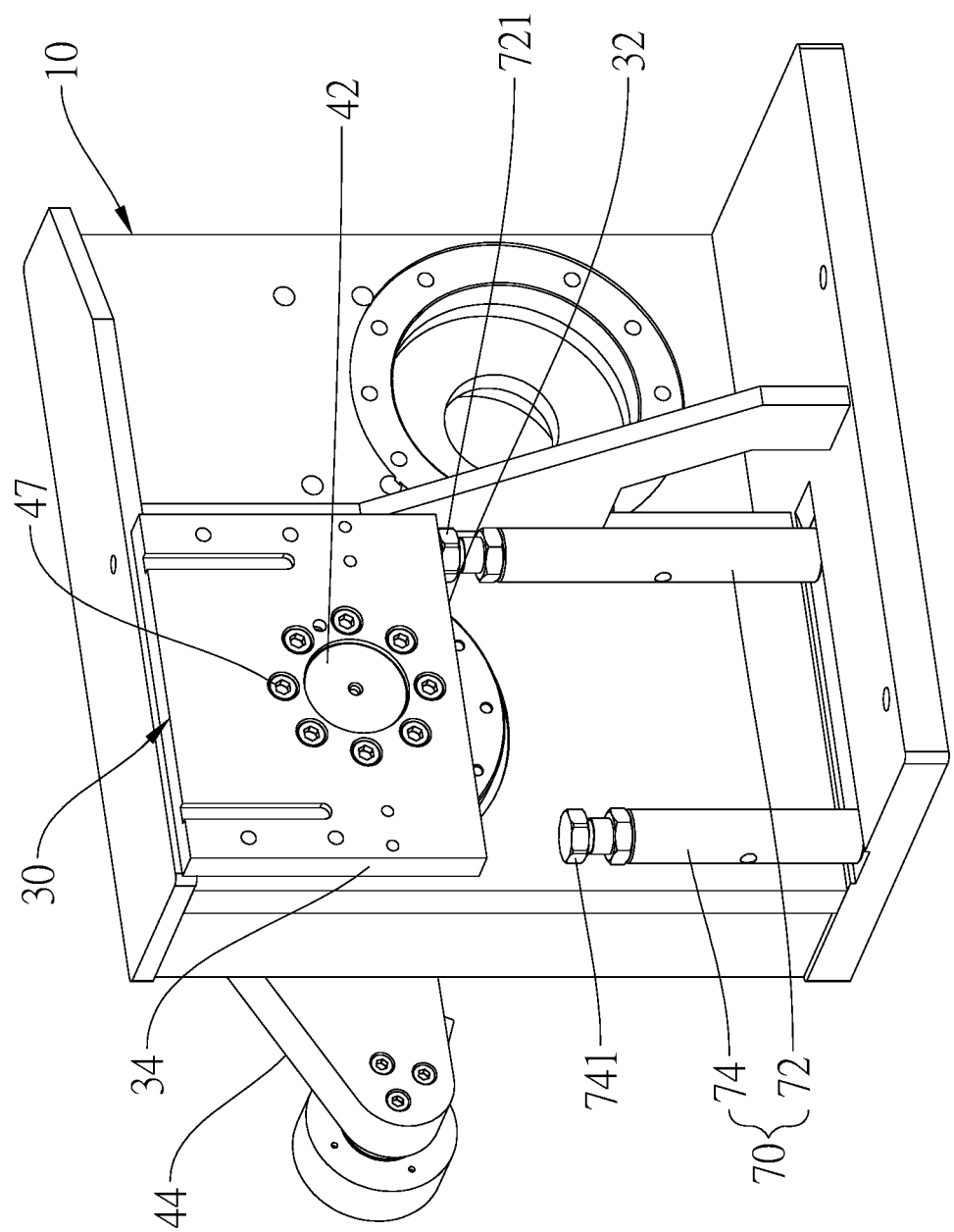
FIG. 7 is a partial perspective view of the robotic tool changer for machining center.
Figure 8:
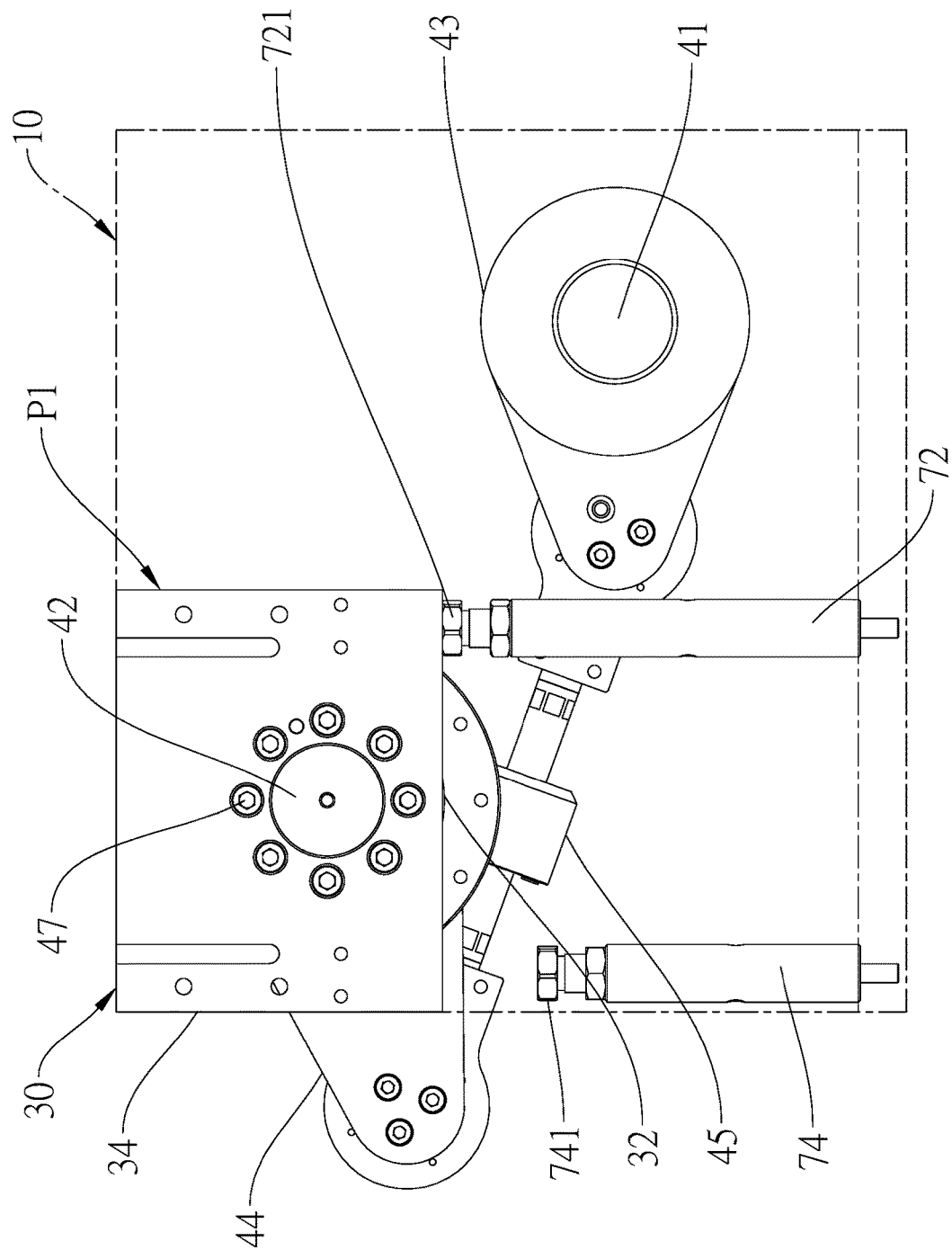
FIG. 8 is a right side view of FIG. 7.
Figure 9:
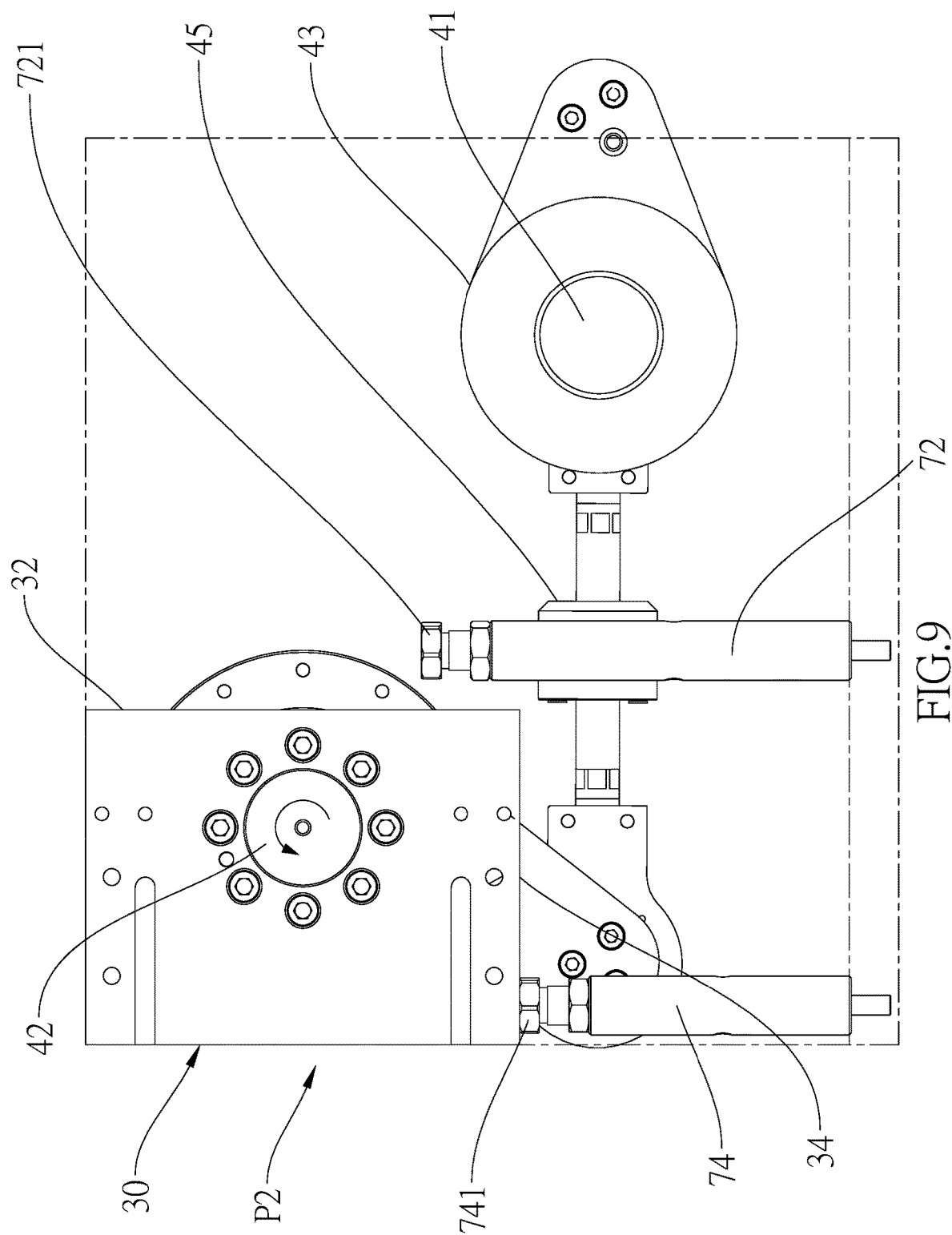
FIG. 9 is similar to FIG. 8, showing the rotation state of a rotary seat of the robotic tool changer for machining center.

As shown in FIG. 7 and FIG. 8, the rotary seat 30 in the current embodiment is generally rectangular and has a first lateral surface 32 and a second lateral surface 34. It can be seen that the rotary seat 30 turns over with the rotation of the second rotating shaft 42. The confining structure 70 includes a first abutting surface for abutting against the first lateral surface 32 and a second abutting surface for abutting against the second lateral surface 34. In the current embodiment, the confining structure 70 includes a first rod 72 and a second rod 74 vertically connected to the body 10. The first rod 72 has a first head 721 and a top surface of the first head 721 forms the first abutting surface. The second rod has a second head 741 and a top surface of the second head 741 forms the second abutting surface. Preferably, the first head 721 can be adjusted to be displaced along an axial direction while the second head 741 can be adjusted to be displaced along an axial direction, for example, by means of screwing to achieve the purpose of displacement. FIG. 8 shows that the first lateral surface 32 of the rotary seat 30 abuts against the first head 721 and the rotary seat 30 stays at a first position P1. FIG. 9 shows that the rotary seat 30 is driven to turn over and the second lateral surface 32 thereof abuts against the second head 741 so that the rotary seat 30 stays at a second position P2.

Figure 10:
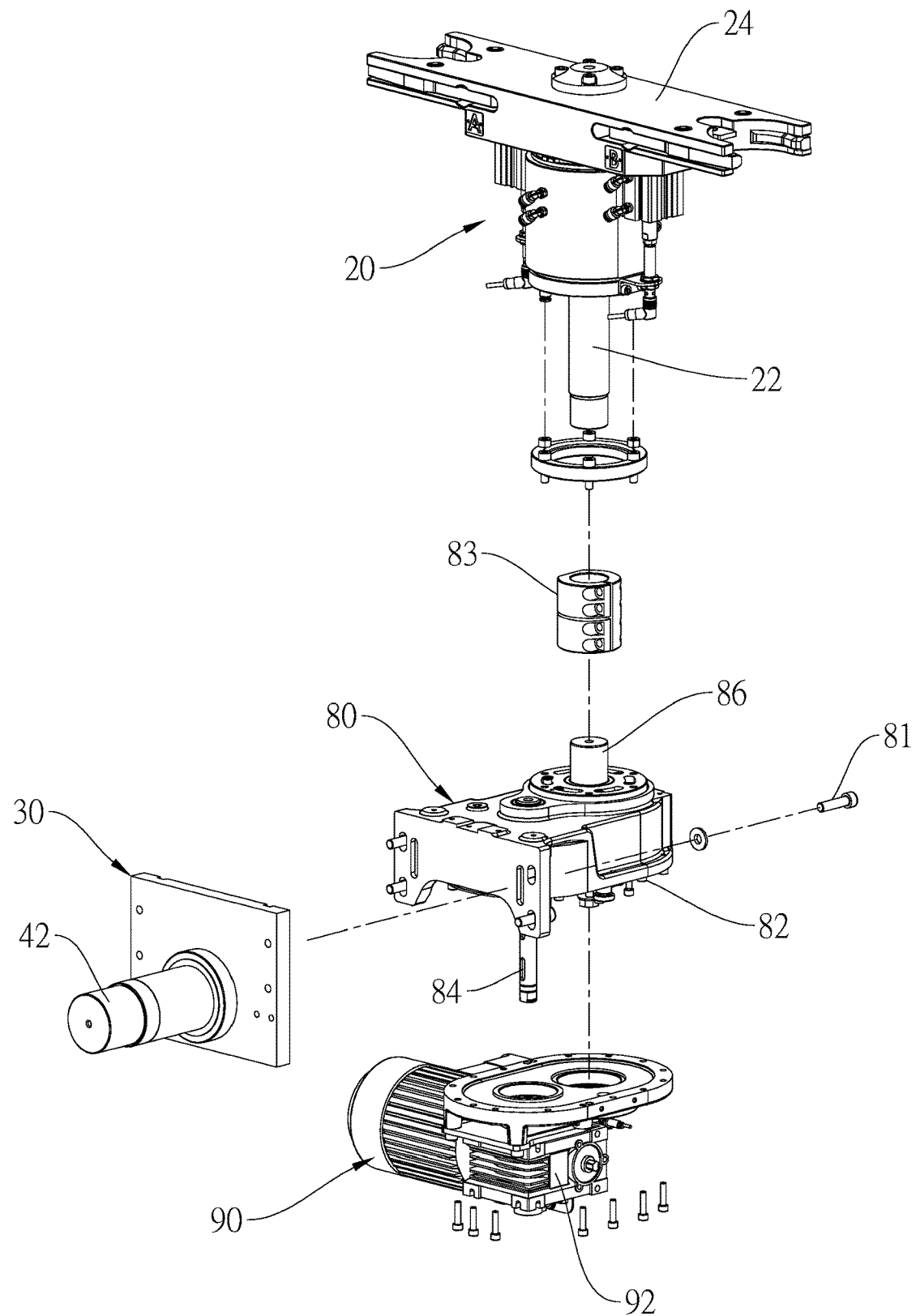
FIG. 10 is a partial exploded view of FIG. 4.
Figure 11:
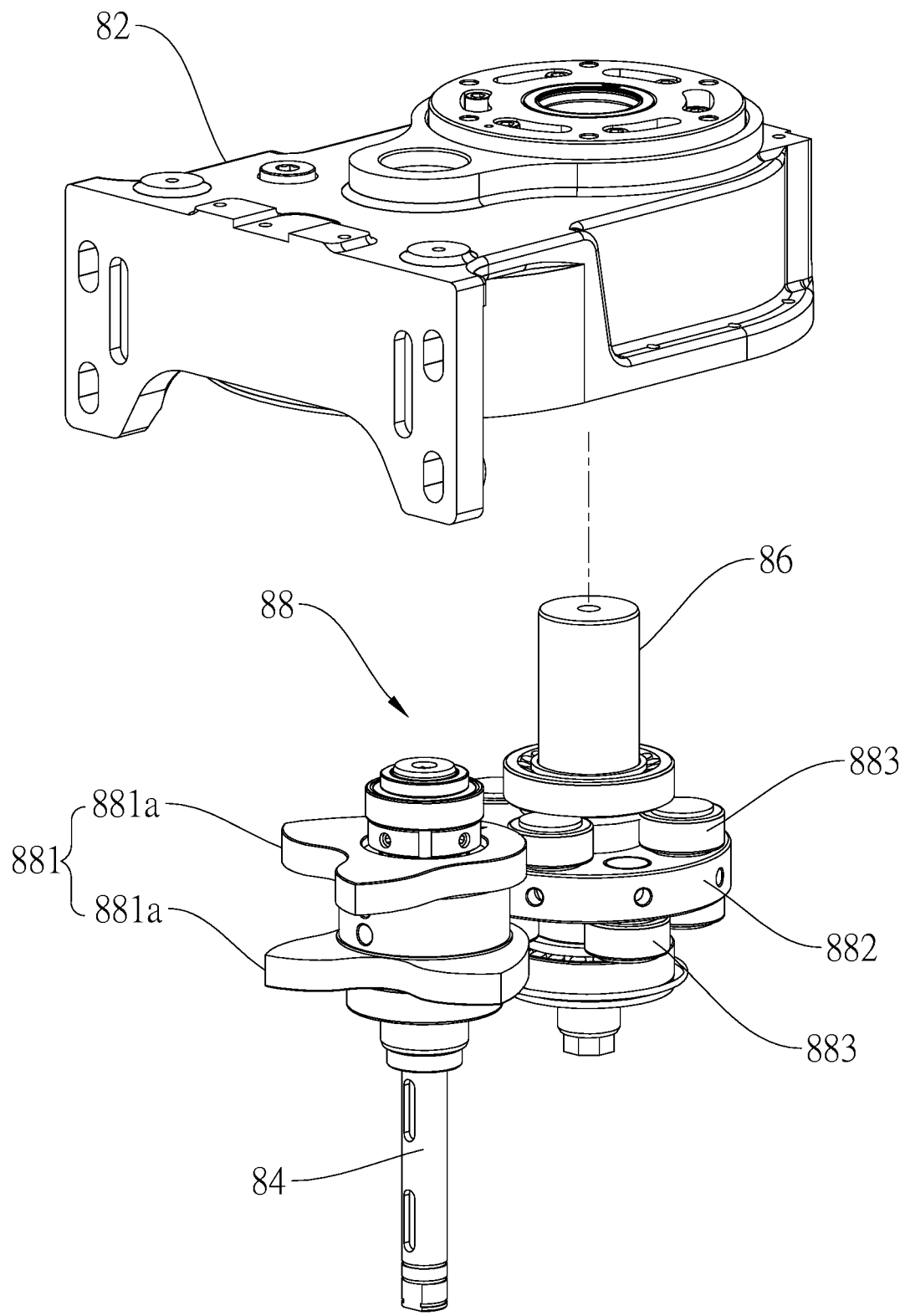
FIG. 11 is a partial exploded view of FIG. 10.

As shown in FIG. 10 and FIG. 11, the second cam indexer 80 is disposed between the rotary seat 30 and the tool changing assembly 20. The second motor 90 is disposed below the second cam indexer 80 and a front end of the second motor 90 is connected to a gear reducer 92. When the rotary seat 30 turns over, the tool changing assembly 20, the second cam indexer 80, and the second motor 90 turn over with the turning of the rotary seat 30. The above-mentioned second cam indexer 80 includes a casing 82, a second input shaft 84, a second output shaft 86, and a second indexing structure 88.

The casing 82 is screwed to the rotary seat 30 through a plurality of bolts 81, and the second input shaft 84, the second output shaft 86, and the second indexing structure 88 are disposed in the casing 82. The second input shaft 84 and the second output shaft 86 are arranged in parallel. One end of the second input shaft 84 passes through the gear reducer 92, and the second motor 90 drives the second input shaft 84 to rotate through the gear reducer 92. One end of the second output shaft 86 protrudes out of the casing 82, and the second output shaft 86 is coaxially connected to the rotating shaft 22 of the tool changing assembly 20 through a shaft coupling 83.

The second input shaft 84 drives the second output shaft 86 to rotate through the second indexing structure 88. In the current embodiment, the second indexing structure 88 includes a second rotating cam 881, a second index plate 882, and a plurality of second index members 883. The second input shaft 84 passes through the second rotating cam 881 and drives the second rotating cam 881 to rotate. The second output shaft 86 passes through the second index plate 882 and is mechanically linked with the second index plate 882. The way that the second input shaft 84 is mechanically linked with the second rotating cam 881 and the way that the second output shaft 86 is mechanically linked with the second index plate 882 are in the mode of keys and corresponding keyways, but not limited thereto. The purpose of linking can also be achieved by an integrally formed structure. The plurality of second index members 883 are arranged on the second index plate 882 at intervals. In the current embodiment, the second rotating cam 881 also includes two plate cams 881a. The plurality of second index members 883, which are bearings with shafts as an example, are arranged in a staggered manner on a front surface and a back surface of the second index plate 882. When the second motor 90 drives the second input shaft 84 to rotate, the two plate cams 881a respectively push the second index members 883 to drive the second output shaft 86 to rotate. The rotating second output shaft 86 drives the rotating shaft 22 to rotate and the rotating shaft 22 drives the tool changing arm 24 to rotate.

To sum up, the robotic tool changer for machining center 100 according to the present invention mainly uses electric control as the main power source to drive the robotic tool changer to be actuated. The advantage of this invention includes that the configuration of the first motor 50 together with the first cam indexer 60 and the drive mechanism 40 can achieve the purpose of a great output power (such as large torque output) driving the rotary seat 30, so that even the heavy objects, such as the tool changing assembly 20, the second cam indexer 80, and the second motor 90, are mounted on the rotary seat 30, the rotary seat 30 can still be smoothly driven to do a reciprocating turning-over between the two fixed positions. The advantage of the invention further includes that the configuration of the second motor 90 with the second cam indexer 80 can control the tool changing arm 24 of the tool changing assembly 20 to perform a 180-degree tool rotation for changing tools. The above-mentioned first motor 50 and the second motor 90 may use AC three-phase motors. By means of the configuration of the motor together with the cam indexer and the drive mechanism 40, the existing problems of hydraulic oil leakage and the environmentally unfriendly subsequent treatment of the hydraulic oil, which occur when the hydraulic cylinder drives the tool changing assembly to move between two fixed positions, can be improved. It is noted that, in the current embodiment, though the heavy objects mounted on the rotary seat 30 are the tool changing assembly 20 and the second cam indexer 80, the practical application is not limited thereto.

Figure 12:
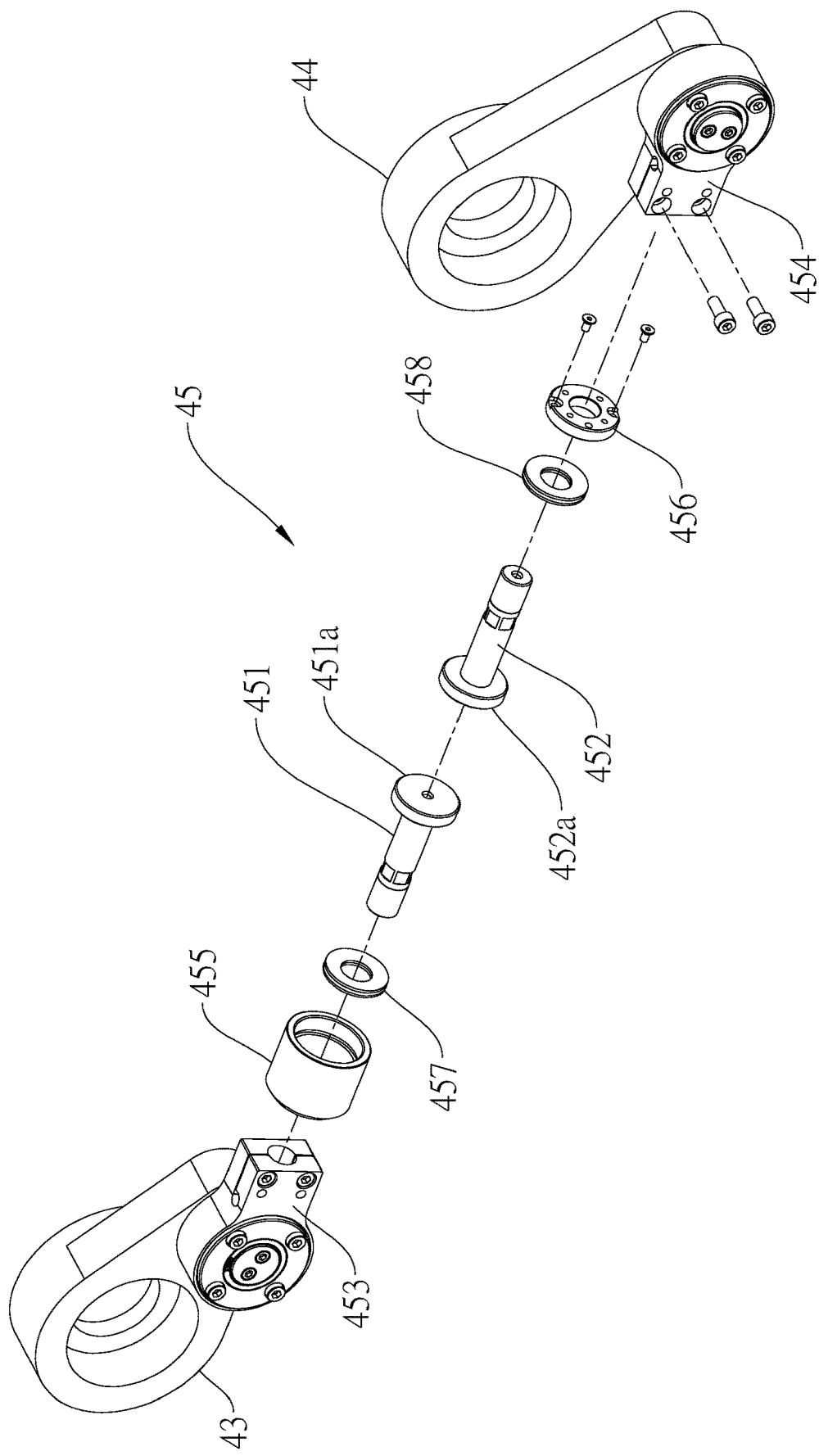
FIG. 12 is a partial perspective view of the robotic tool changer for machining center.
Figure 13:
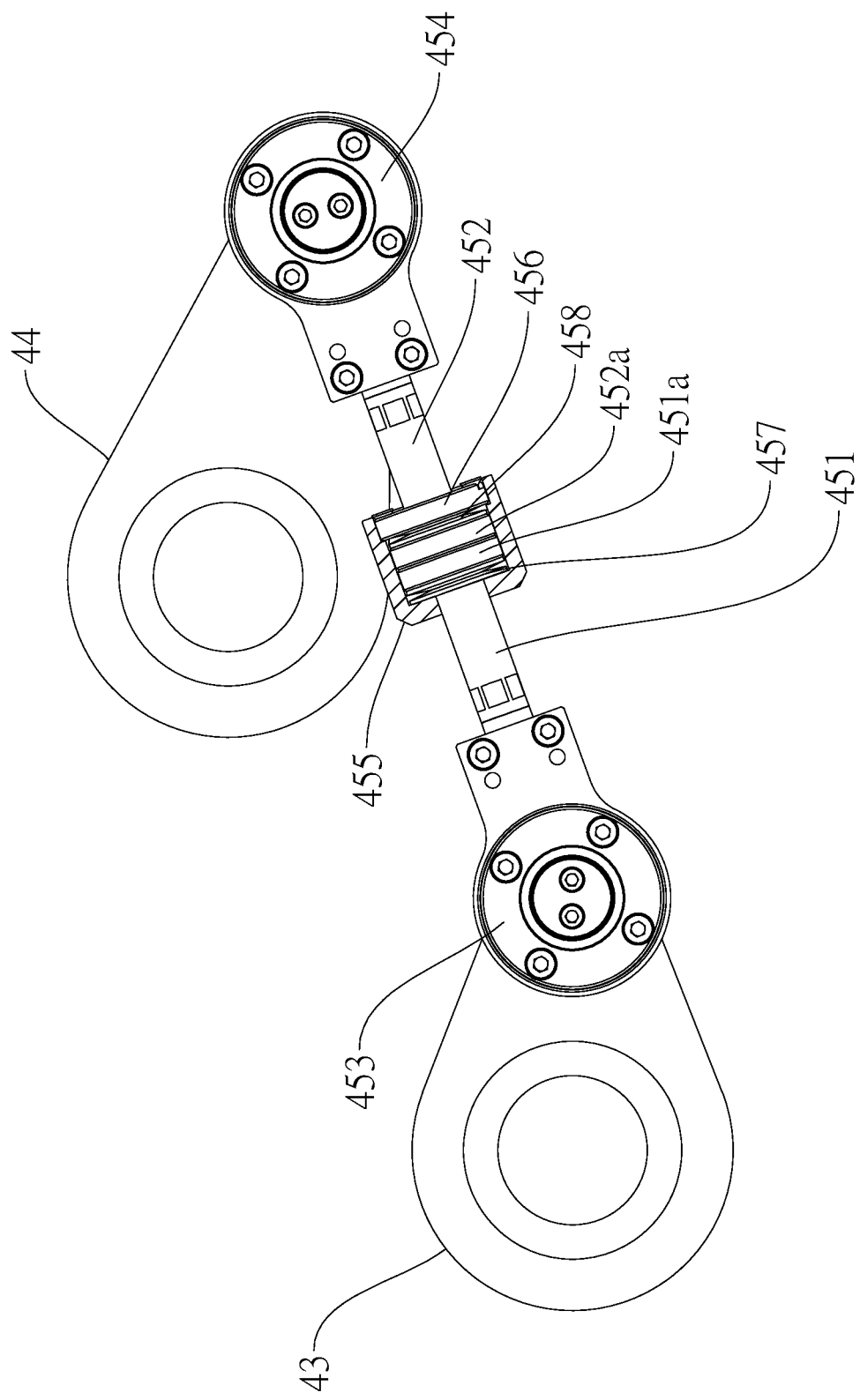
FIG. 13 is a front view of the assembly of the components shown in FIG. 12.

In addition to being a single member, the linkage member 45 of the above-mentioned embodiment can also be a structure with an adjustable length. For example, the linkage member 45 includes a first rod body 451 and a second rod body 452, in which the first rod body 451 and the second rod body 452 are connected in a way that a total length of the linkage member 45 can be adjusted, such as screwing. An end of the first rod body 451 is pivotally connected to the first swing arm 43 while an end of the second rod body 452 is pivotally connected to the second swing arm 44. With the adjustable length, the linkage member 45 is more flexible in installation, which is adapted when the distance between the centers of the first rotating shaft 41 and the second rotating shaft 42 is changed. As shown in FIG. 12 and FIG. 13, in the current embodiment one end of the first rod body 451 is pivotally connected to the first swing arm 43 by connecting with a first bearing housing 453 while one end of the second rod body 452 is pivotally connected to the second swing arm 44 by connecting with a second bearing housing 454. The other end of the first rod body 451 and that of the second rod body 452 respectively form a T-shaped head 451a and a T-shaped head 452a. The T-shaped heads are accommodated in a rod adjusting sleeve 455 and an end of the rod adjusting sleeve 455 is engaged with a cap 456. The T-shaped heads are confined in the rod adjusting sleeve 455 by the cap 456. Between the T-shaped head 451a and a bottom wall of the rod adjusting sleeve 455 provide a plurality of disc springs 457 while between the T-shaped head 452a and the cap 456 provide a plurality of disc springs 458. Thereby, the length adjustment mechanism of the linkage member 45 has a buffering effect, which makes the first swing arm 43 and the second swing arm 44 rotate more smoothly.

It must be pointed out that the embodiments described above are only some embodiments of the present invention. All equivalent structures which employ the concepts disclosed in this specification and the appended claims should fall within the scope of the present invention.

What is claimed is:

1. A robotic tool changer for a machining center, comprising:
   a body;
   a drive mechanism including a first rotating shaft, a second rotating shaft, a first swing arm, a second swing arm, and a linkage member, wherein the first rotating shaft and the second rotating shaft respectively rotatably pass through the body, and a part of the first rotating shaft and a part of the second rotating shaft are located outside the body; the first swing arm is fixed to the part of the first rotating shaft that is outside the body; the second swing arm is fixed to the part of the second rotating shaft that is outside the body; the linkage member includes two ends which are pivotally connected to the first swing arm and the second swing arm respectively;

a first motor for driving the first rotating shaft to rotate; and a rotary seat which is fixed to the second rotating shaft so as to rotate with the second rotating shaft, and which moves in a reciprocating rotational movement between a first position and a second position.

2. The robotic tool changer for the machining center as claimed in claim 1, wherein the first swing arm takes an axis of the first rotating shaft as a rotation center; the second swing arm takes an axis of the second rotating shaft as a rotation center; a distance from a pivot center between the first swing arm and one end of the linkage member to the rotation center of the first swing arm is defined as a first distance; a distance from a pivot center between the second swing arm and the other end of the linkage member to the rotation center of the second swing arm is defined as a second distance; the first distance is less than the second distance.

3. The robotic tool changer for the machining center as claimed in claim 1, comprising a first cam indexer which includes a first input shaft, a first output shaft, and a first indexing structure, wherein the first motor drives the first input shaft to rotate; the first output shaft is coaxially connected to the first rotating shaft; the first input shaft drives the first output shaft to rotate through the first indexing structure.

4. The robotic tool changer for the machining center as claimed in claim 3, wherein the first input shaft and the first output shaft are arranged in parallel; the first indexing structure includes a first rotating cam, a first index plate and a plurality of first index members; the first input shaft passes through the first rotating cam, the first output shaft passes through the first index plate, the plurality of first index members are arranged on the first index plate at intervals, and the first rotating cam pushes the plurality of first index members respectively while rotating.

5. The robotic tool changer for the machining center as claimed in claim 1, comprising a confining structure including a first abutting surface and a second abutting surface, wherein the rotary seat includes a first lateral surface and a second lateral surface; when the first lateral surface abuts against the first abutting surface, the rotary seat is located at the first position; when the second lateral surface abuts against the second abutting surface, the rotary seat is located at the second position.

6. The robotic tool changer for the machining center as claimed in claim 5, wherein the confining structure includes a first rod and a second rod which are connected to the body; the first rod has a first head and the second rod has a second head; the first head can be adjusted to be displaced along an axial direction and the second head can be adjusted to be displaced along an axial direction; the first head has the first abutting surface and the second head has the second abutting surface.

7. The robotic tool changer for the machining center as claimed in claim 1, wherein the linkage member of the drive mechanism includes a first rod body and a second rod body; the first rod body and the second rod body are connected in a way that a total length of the linkage member can be adjusted; an end of the first rod body is pivotally connected to the first swing arm while an end of the second rod body is pivotally connected to the second swing arm.

8. The robotic tool changer for the machining center as claimed in claim 1, comprising a tool changing assembly disposed at the rotary seat, wherein the tool changing assembly includes a rotating shaft and a tool changing arm, the rotating shaft is controlled to rotate, and the tool changing arm is connected to an end of the rotating shaft and has opposite ends for respectively gripping a tool.

9. The robotic tool changer for the machining center as claimed in claim 8, comprising a second cam indexer and a second motor, wherein the second cam indexer is disposed between the rotary seat and the tool changing assembly and includes a second input shaft, second output shaft and a second indexing structure; the second motor drives the second input shaft to rotate; the second output shaft is coaxially connected to the rotating shaft; the second input shaft drives the second output shaft to rotate through the second indexing structure.

10. The robotic tool changer for the machining center as claimed in claim 9, wherein the second input shaft and the second output shaft are arranged in parallel; the second indexing structure includes a second rotating cam, a second index plate and a plurality of second index members; the second input shaft passes through the second rotating cam, the second output shaft passes through the second index plate, the plurality of second index members are arranged on the second index plate at intervals, and second rotating cam pushes the plurality of second index members respectively while rotating.

11. The robotic tool changer for the machining center as claimed in claim 1, wherein the first motor drives the first swing arm to do a reciprocating swing between angles of 0 degrees and 180 degrees through the first rotating shaft while the linkage member drives the second swing arm to do a reciprocating swing between angles of 0 degrees and 90 degrees.

12. The robotic tool changer for the machining center as claimed in claim 1, wherein the first motor drives the first rotating shaft to make the first swing arm complete one rotation so that the linkage member drives the second swing arm to complete one reciprocating swing between angles of 0 degrees and 90 degrees.

* * * * *